United States Patent [19]

Farrow et al.

[11] Patent Number: 4,551,190
[45] Date of Patent: * Nov. 5, 1985

[54] ALIGNING MEANS FOR TAPE SPLICER

[75] Inventors: Robert I. Farrow; Richard L. Clark, both of Burlington, N.C.

[73] Assignee: American Multimedia, Inc., Burlington, N.C.

[*] Notice: The portion of the term of this patent subsequent to Oct. 9, 2001 has been disclaimed.

[21] Appl. No.: 628,441

[22] Filed: Jul. 6, 1984

Related U.S. Application Data

[63] Continuation of Ser. No. 540,071, Oct. 7, 1983, Pat. No. 4,475,970.

[51] Int. Cl.[4] .................. B31F 5/00; B65H 19/00; B32B 31/00; B65C 9/08
[52] U.S. Cl. .................. 156/159; 156/157; 156/506; 156/517; 156/518; 156/572
[58] Field of Search .................. 156/505–506, 156/517–518, 520–521, 572, 157, 159

[56] References Cited

U.S. PATENT DOCUMENTS

| | | | |
|---|---|---|---|
| 3,717,314 | 2/1973 | King | 242/56 R |
| 3,753,834 | 8/1973 | King | 242/56 R |
| 4,328,066 | 5/1982 | Kiuchi et al. | 156/506 |
| 4,475,970 | 10/1984 | Farrow et al. | 156/159 |

Primary Examiner—Edward Kimlin
Assistant Examiner—Merrell C. Cashion
Attorney, Agent, or Firm—W. Thad Adams, III

[57] ABSTRACT

An integrally formed ratchet (90) and star wheel (95) is disclosed which rotates in unison with a tape applicator wheel (85). Eccentrically formed fingers (96a–d) cooperate with a downwardly facing wall to align and position applicator wheel (85) into correct position after each reciprocation of the splicer (30). Correct alignment is essential because a cutter blade 127 cuts the tape on the applicator wheel into pre-determined lengths by passing through a notch (104) in applicator wheel (85). Misalignment of the applicator wheel (85) may cause blade (127) to impact the applicator wheel (85) itself, damaging or destroying it.

12 Claims, 9 Drawing Figures

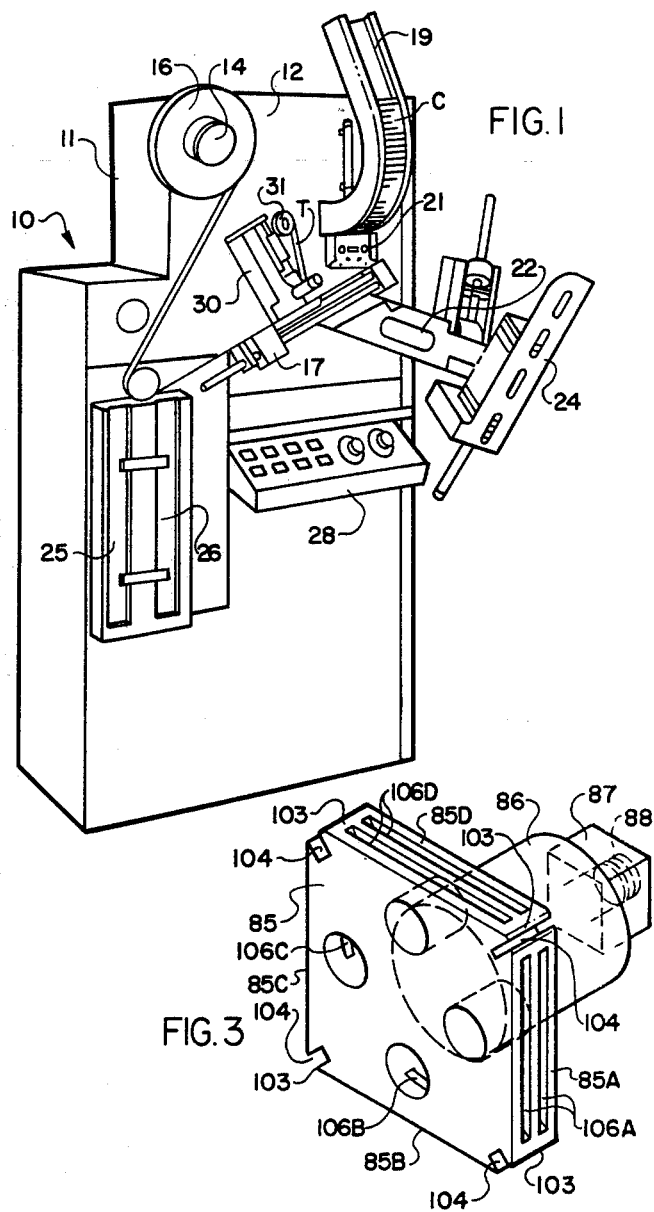

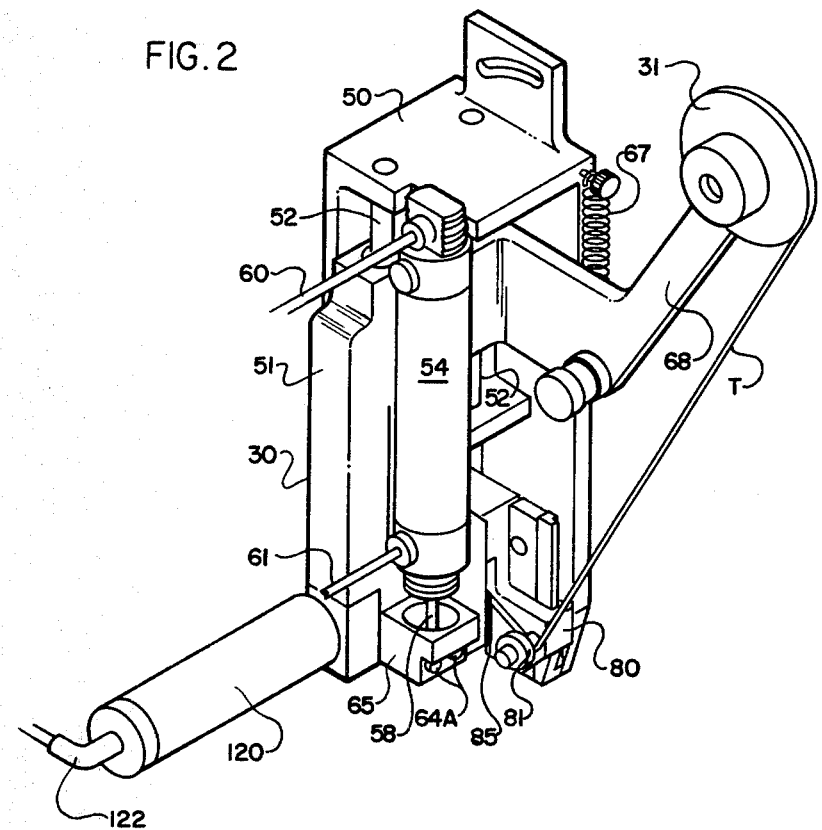

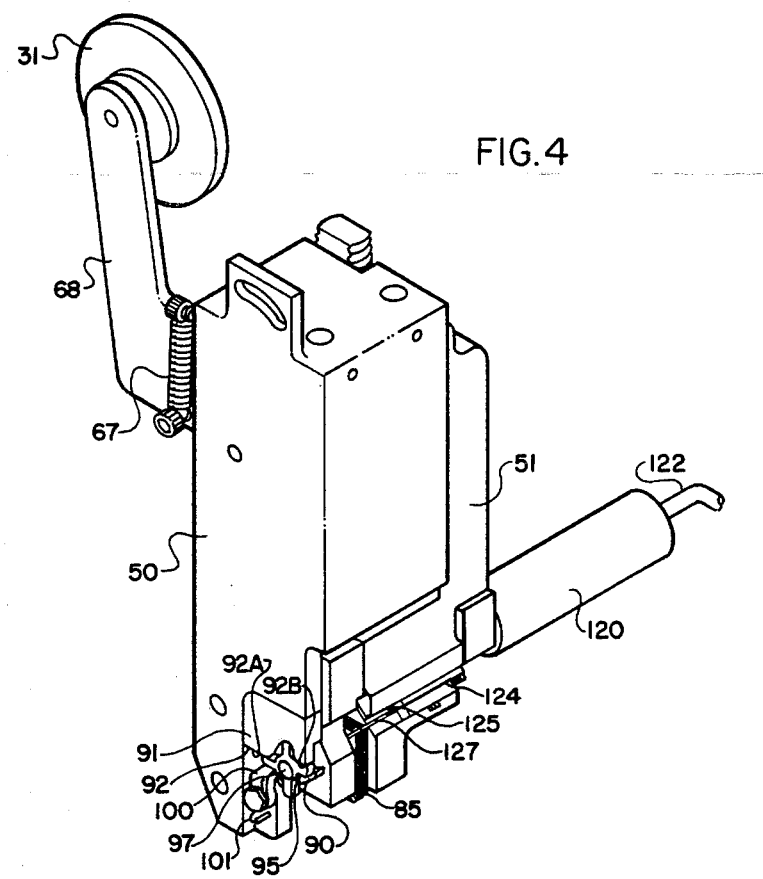
FIG. 4
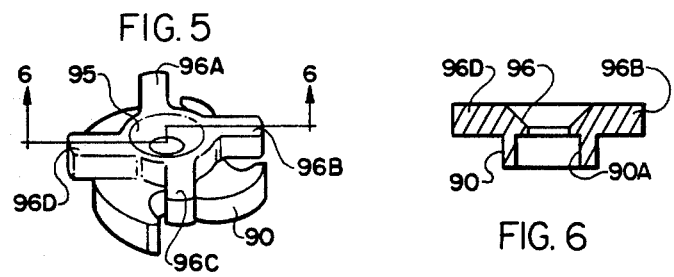
FIG. 5
FIG. 6

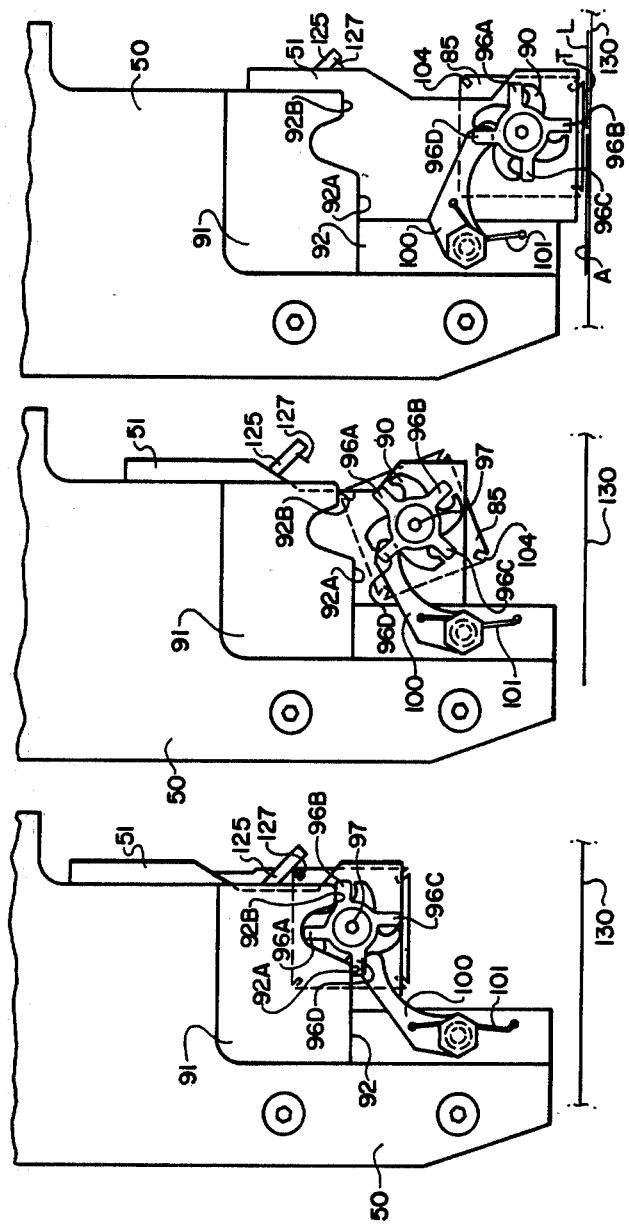

ALIGNING MEANS FOR TAPE SPLICER

This is a continuation in part of application Ser. No. 540,071 filed Oct. 7, 1983, now U.S. Pat. No. 4,475,970.

TECHNICAL FIELD AND BACKGROUND OF THE INVENTION

This invention relates to means for aligning an applicator wheel on a tape splicer of the type which splices a pre-determined length of recording tape into a cassette. In splicers of this general type the process is started with a cassette which contains two rotatably mounted hubs connected together by a relatively short length of leader tape. To load the cassette with recording tape, the leader is cut intermediate the two hubs and the forward end of a length of recording tape is spliced onto the leader. The tape is very rapidly wound into the cassette and when the end of the tape is reached the other end of leader is moved into abutting relationship with the trailing end of the recording tape and spliced. In each case, the splice is made by first abutting the recording tape and the leader and overlaying a short length of adhesive which connects the two lengths of tape together. In the embodiment disclosed in this application, the splicing tape is applied in short lengths by means of a rotatably mounted applicator wheel which reciprocates down into and up out of tape splicing contact with the abutted ends of the leader and recording tape.

The applicator wheel described in this application is made of a hard plastic material and is provided with notches in each corner. After each reciprocation, a blade is moved laterally into the notch, cutting the tape before the next downward movement of the applicator wheel occurs.

The applicator wheel is controlled during its downward movement by a ratchet and pawl. However, the upward movement of the applicator wheel out of contact with the tapes is not controlled by the ratchet. Due to the very rapid downward and upward movement of the applicator wheel, and the sudden halt to the upward movement of the applicator wheel, the wheel can become misaligned. If the wheel is jarred out of alignment, the blade will not cut the tape by passing through the notch in the corner of the applicator wheel but will instead cut into the applicator wheel itself, damaging or destroying the wheel and bending or breaking the blade. Furthermore, since the tape is not properly cut, the next splice is not made, resulting in an improperly wound cassette which must be rejected as defective.

SUMMARY OF THE INVENTION

Therefore it is an object of the invention to provide aligning means for cooperating with an applicator wheel to place the applicator wheel in proper alignment for the tape on the applicator wheel surface being cut and the next application of tape.

It is another object of the present invention to provide an integrally formed ratchet and body, the ratchet being used to positively rotate the applicator wheel into tape applying position and the body aligning the applicator wheel into proper tape cutting and applying position after each application of tape.

It is another object of this invention to provide a method of feeding and applying splicing tape to two adjacent ends, which method includes aligning the applicator wheel during each reciprocation thereof into exact alignment with a splice bed.

These and other objects and advantages of the invention are achieved by providing an apparatus for feeding and applying splicing tape to two adjacent tape ends positioned on a planar splice bed. The apparatus comprises a splicing tape applicator wheel mounted for rotation about a central axis and having a plurality of planar peripheral faces. Each face of the applicator wheel defines a splicing tape carrying surface. A source of splicing tape is provided and reciprocating means move successive tape carrying surfaces of the applicator wheel perpendicularly into and out of contact with two tape ends to be spliced. Motion converting means cooperate with the reciprocating means and the applicator wheel to convert perpendicular movement of the applicator wheel into unison rotation of the applicator wheel, thereby moving a next successive tape carrying surface into position for application of the splicing tape. Aligning means according to the present invention cooperate with the applicator wheel and the motion converting means for aligning successive planar surfaces of said applicator wheel into proper alignment with the planar splice bed after each application of splicing tape and before the next application. The alignment means also ensures that the blade cutter which cuts the tape on the applicator wheel into proper length segments passes through a notch in the corner of the applicator wheel, rather than impacting the applicator wheel itself. According to the embodiment of the invention described in this application, the alignment means includes stop means cooperating with the motion converting means to stop the unison perpendicular and rotational movement of the applicator wheel. The alignment means also comprises a stop means engagement member mounted for unison perpendicular rotational movement with the applicator wheel and positioned to engage the stop means at the termination of each upward reciprocation of the applicator wheel to reposition successive planar sides of the applicator wheel in preparation for the next downward movement thereof into tape-applying position.

According to a preferred embodiment of the invention the stop means engagement member comprises a body having a plurality of outwardly projecting shoulders, at least some of the shoulders adapted to engage the stop means and thereby align the applicator wheel. Preferably, the body is integrally formed with a ratchet which is mounted for unison perpendicular and rotational movement with the applicator wheel and which is rotated during the downward movement of the applicator wheel by a pawl.

According to the method of the invention, a splicing tape applicator wheel is provided having a plurality of planar peripheral faces. The applicator wheel is mounted for rotation about a central axis and is provided a source of splicing tape for being applied to successive tape carrying surfaces on the applicator wheel. The applicator wheel is reciprocated perpendicularly into and out of contact with the two tape ends to be spliced on a planar splice bed for applying a length of splicing tape from said tape carrying surface. The perpendicular movement of the applicator wheel is converted into unison rotation of the applicator wheel, thereby moving a next succesive tape carrying surface into tape applying position. During each reciprocation of the applicator wheel, the applicator wheel is aligned into exact alignment with the splice bed.

DESCRIPTION OF THE DRAWINGS

These and other objects and advantages of the invention will be explained in the following Description of the Preferred Embodiment when taken in conjunction with the following drawings, in which:

FIG. 1 is a perspective view of a tape winder on which the aligning means according to the present invention is used;

FIG. 2 is a perspective view of a tape splicer according to the present invention;

FIG. 3 is an enlarged view of the tape applicator wheel according to the present invention;

FIG. 4 is a view opposite that in FIG. 2 of the tape splicer according to the present invention;

FIG. 5 is an enlarged perspective view of the integrally formed ratchet and body according to the present invention;

FIG. 6 is a cross sectional view of the ratchet and body taken substantially alongs lines 6—6 of FIG. 5;

FIG. 7 shows the applicator wheel at the upper extent of its movement ready to begin its downward stroke towards the splice bed;

FIG. 8 shows the applicator wheel being rotated downwardly into contact with the splicing bed; and.

FIG. 9 shows the applicator wheel in its downward movement.

DESCRIPTION OF THE PREFERRED EMBODIMENT

Referring now specifically to the drawings, an audio tape cassette winder is shown and generally designated at broad reference numeral 10. Winder 10 comprises a console 11 within which are mounted the major electrical, pneumatic and mechanical operating parts. Console 11 has a front cover 12 which supports a rotatably driven audio tape supply reel 14 onto which is would a supply of magnetic tape 16; a tape leader extractor assembly 17; a cassette supply tray 19 which holds a plurality of cassettes "C"; cassette winding spindle 21; a defective cassette rejector assembly 22; and a stacking trough 24 for finished cassettes. A pair of vacuum take-up columns 25 and 26 selectively exert a vacuum force on tape 16 to positively control tape tension as it is unwound from the supply reel 14 and wound onto cassette "C" by cassette winding spindle 21. A control panel 28 enables the operator to manipulate various functions of winder 10. A tape splicing apparatus 30 is mounted on front panel 12 and dispenses adhesive splicing tape "T" from a supply spool 31.

Supply reel 14 may be wound with unrecorded audio tape which is then used to produce "blank" cassettes to be used for later recording. Alternatively, supply reel 14 may be wound with tape containing a series of identical recordings ("albums") of music, speach or other audio signals. A low frequency "Q" signal is recorded onto the audio tape between each album and indicates the end of one album and the beginning of the next. Therefore, in loading cassettes with pre-recorded tape, a "Q" signal sensor is provided which stops the movement of the tape and permits the tape to be severed between the albums. The various electrical, pneumatic and mechanical components used to drive the supply reel sense the presence of each "Q" signal, extract the leader from each cassette and prepare the leader for splicing; wind each cassette with a pre-determined amount of audio tape and eject the cassette to make room for the next one, are all part of the prior art and are not the invention per se of this application.

Patents examplary of the prior art referred to above included U.S. Pat. Nos. 3,717,314 and 3,753,834.

The splicer 30 is operable for splicing a wide variety of tapes, sheets, films and the like. Referring now to FIG. 2, splicer 30 is mounted in a stationary position on front panel 12 of winder 10 by means of a base, referred to as a splicer support block 50. A splice block 51 is mounted on splicer support block 50 for reciprocating up and down motion along two vertically extending splice block guide rails 52, carried by the upper end of splicer support block 50.

Reciprocating up and down motion of splice block 51 is effected by a two-way pneumatic splice cylinder 54 which is mounted to the splicer support block 50. A splice piston rod 58 is slidably positioned in splice cylinder 54 and connected to a piston (not shown) for movement in response to air pressure within splice cylinder 54. Splice cylinder 54 is a two-way cylinder and is provided with a down piston supply tube 60 and an up piston supply tube 61. Splice piston rod 58 is secured by the end remote from splice cylinder 54 to a piston rod mount 65 and is removable by loosening two screws 64a.

By introducing compressed air through down piston supply tube 60 into splice cylinder 54, piston rod 58 is extended outwardly from within cylinder 54, causing splice block 51 to move downwardly along guide rails 52. Introducing compressed air from up piston supply tube 61 into splice cylinder 54 causes piston rod 58 to be retracted within splice cylinder 54, and the attached splice block 51 to be moved upwardly.

Splice block 51 is assisted in its return to the upper position by splice block return assist spring 67, the upper end of which is attached to the stationary splicer support block 50 and the lower end of which is attached to splice block 51. Spring 67 also reduces the force of the downward movement of splice block 51 under the combined influence of gravity and splice cylinder 54.

A spool 31 of splicing tape "T" is carried by a splicing tape spool mount 68 connected to and moving in unison with splice block 51.

A guide bearing mount 80 is also positioned on the movable splice block 51 and carries a guide bearing 81. Adhesive splicing tape from splicing tape spool 31 is properly positioned for application by guide bearing 81 around which the splicing tape passes.

Referring now to FIG. 3, an applicator wheel 85 is integrally formed with a cylindrical mounting sleeve 86 and a concentrically formed, square ratchet mount bushing 87 having a screw receiving bore 88 therein. Applicator wheel 85 is mounted to splice block 50.

Referring to FIG. 4, a ratchet 90 having a square bore 90A is mounted on ratchet mount bushing 87. Since ratchet mount bushing 87 is square, the ratchet 90 and applicator wheel 85 always rotate in unison. Ratchet 90 is rotated by a pawl 100 pivotally mounted on splicer support block 50. Pawl 100 is biased by a spring 101 to return to its starting position after each reciprocation.

Referring now to FIG. 3, applicator wheel 85 -a polygon in this case- is substantially square. Each corner is truncated to provide a flat corner surface 103 into which is formed a cutter blade access slot 104. In the description that follows, the four sides of applicator wheel 85 will be arbitrarily referred to as 85a, 85b, 85c and 85d, respectively. Each of the four sides 85a–d comprise planar tape carrying surfaces. On each tape carrying surface 85a–d is formed a pair of ports 106a, 106b, 106c and 106d, respectively. Ports 106a–d are formed in the body of applicator wheel 85 so that they each define a radius.

Referring now to FIG. 4, tape "T" is applied to applicator wheel 85 in a continuous length. Therefore, the tape must be cut into appropriate length sections. This is accomplished by means of a reciprocating cutter blade assembly. Reciprocating movement is provided by a tape cutter cylinder 120 which is supplied with pressurized air by a cutting cylinder air supply tube 122. Referring to FIG. 6, tape cutter cylinder 120 moves a tape cutter piston rod through a slot 124 formed in splice block 51. A blade carrier 125 carries a cutter blade 127. As is best shown in FIG. 4, cutter blade 127 slides into one of the blade access slots 104 aligned therewith, cutting splicing tape "T" into a segment approximately the same length as each of the tape carrying surfaces 85a–d of applicator wheel 85. In the particular embodiment shown in FIG. 4, the tape cutter cylinder 120 is a one-way cylinder with the tape cutter piston rod being returned to its normal retracted position by a spring (not shown).

The two tape ends to be spliced are held in position by means of a splicing bed 130, the precise construction of which may vary considerably from one type of winder to another. The two tapes to be spliced may be two lengths of audio or video recording tape, a length of leader to either audio or video recording tape, or any other of a wide variety of combinations of leader to tape, film or other substances. For purposes of illustration a length of leader tape "L" is shown positioned on splicing bed 130 in abutting relation to a length of audio recording tape "A". As is shown in FIG. 10, the tapes "L" and "A" very nearly abut at a point directly beneath applicator wheel 85 in splicing tape "T" receiving position.

Referring now to FIG. 4, aligning means according to the present invention are shown in position on the splicer 30. Alignment means includes a stop means which comprises a stationary wall 91 carried by the stationary splicer support block 50. The stationary wall 91 defines a downwardly facing free surface 92. The alignment means also includes a stop means engagement member, which comprises a body in the form of a star wheel 95. Star wheel 95 is shown in FIG. 5 and is integrally formed with ratchet 90 and includes a central bore 96 which communicates with bore 90a of ratchet 90 and four outwardly extending shoulders in the form of fingers 96a through 96d. As will be observed in FIG. 5, each of the fingers 96a–d are eccentric to the axis of star wheel 95. Adjacent fingers, for example 96a and 96b are perpendicular to each other. Opposite fingers, for example, 96a and 96c, are parallel to each other.

Star wheel 95 and ratchet 90 are mounted on splice block 51 by means of a shaft 97 which extends through bores 96 and 90a. Shaft 97 mates with the ratchet mount bushing 87. Star wheel 95 and ratchet 90 therefore rotate in unison with applicator wheel 85.

Referring now to FIG. 7, the downwardly facing free surface defines two separate parallel planes 92a and 92b. The lateral distance between the two planes 92a and 92b is designed to mate exactly with any two opposite fingers of star wheel 95, for example 96b and 96d as is shown in FIG. 7. Since star wheel 95, ratchet 90 and applicator wheel 85 rotate in unison, the position of applicator wheel 85 can be very precisely set.

The position shown in FIG. 7 constitutes both the starting and ending point for each reciprocation of splicer 30. In operation, a pulse of compressed air through down piston supply tube 60 propels splice block 51 downwardly. One of the teeth of ratchet 90 catches on pawl 100. Pawl 100 rotates ratchet 90 as splice block 51 continues downwardly. As is shown in FIG. 8, ratchet 90, star wheel 95 and applicator wheel 85 all begin to rotate in unison. At its lowermost position splice block 51 has descended towards the splicing bed 130 and applicator wheel 85, having a layer of tape "T" thereon, impacts splice bed 130 and applies the tape "T" to the abutting ends of tapes "A" and "L". At this point, the surface of applicator wheel 85 should be parallel and flush with splice block 130.

Because of the speed at which winder 10 operates, the splicing process must take place very quickly. Therefore, a pulse of compressed air through up piston supply tube 61 rapidly moves splice block 51 back to its upper position. This upward movement is aided by spring 67.

During its upward movement, neither the applicator wheel 85, ratchet 90 or star wheel 95 is under any type of positive control. Therefore, the rapid movement upwardly may cause applicator wheel 85 to rotate slightly out of alignment. As the ratchet 90 moves upwardly, pawl 100 rides over one of its curved teeth and may increase the possibility of moving applicator wheel 85 out of alignment. If applicator wheel 85 is out of alignment when it reaches its uppermost position, the impact of fingers 96b and 96d on walls 92b and 92a restore proper alignment so that when blade 127 moves forward it passes cleanly through one of the slots 104, cutting tape "T" rather than impacting the applicator wheel 85 itself. This process also reorients the surfaces of applicator wheel 85 in their proper parallel and perpendicular relation to splicing bed 130.

An apparatus and method for aligning the applicator wheel of a splicing apparatus is described above. Various details of the invention may be changed without departing from its scope. Furthermore, the foregoing description of a preferred embodiment of the apparatus and method according to the present invention is provided for the purpose of illustration only and not for the purpose of limitation—the invention being defined by the claims.

I claim:

1. An apparatus for feeding and applying splicing tape to two adjacent tape ends positioned on a splice bed, comprising:
   (a) a splicing tape applicator wheel mounted for rotation and having a plurality of peripheral faces, each face defining a splicing tape carrying surface;
   (b) a source of splicing tape for being applied to successive tape carrying surfaces;
   (c) movement means for moving a tape carrying surface of said applicator wheel into and out of contact with the two tape ends to be spliced and applying a length of splicing tape thereto;
   (d) motion converting means cooperating with said movement means and said applicator wheel for converting movement of said applicator wheel into unison rotation of said applicator wheel thereby moving a next successive tape carrying surface into position for application of the splicing tape during the next movement;
   (e) aligning means cooperating with said applicator wheel and said motion converting means for aligning successive surfaces of said applicator wheel in proper alignment with the splice bed after each application of splicing tape and before the next, said alignment means including stop means cooperating with said motion converting means to stop the rotational movement of said applicator wheel and a stop means engagement member mounted for unison movement with said applicator wheel and positioned to engage said stop means at the termination of each upward movement of said applicator wheel to reposition successive sides of said applicator wheel in preparation of the next downward movement thereof into tape-applying position, and wherein said stop means engagement member comprises a body having a plurality of discreet outwardly projecting shoulders, at least one of said shoulders adapted to engage said stop means and thereby align said applicator wheel.

2. An apparatus according to claim 1 wherein said motion converting comprises a ratchet mounted for unison perpendicular and rotational movement with said applicator wheel, a pawl mounted on said apparatus and cooperating with said ratchet to rotate said applicator wheel during each downward movement of said applicator wheel but not each upward movement of said applicator wheel.

3. An apparatus according to claim 2, wherein said body and said ratchet are integrally formed.

4. An apparatus according to claim 3, wherein said stop means comprises a stationary wall defining a free surface for engagement by at least some of the shoulders of the body.

5. An apparatus according to claim 4, wherein the shoulders of said body are eccentric to the center of said body and wherein the free surface of said wall defines two separate planes for simultaneously engaging at least two of said eccentric shoulders.

6. An apparatus according to claim 5, wherein said body has at least four shoulders.

7. An apparatus according to claim 3, wherein said ratchet is mounted for rotation concentric with said applicator wheel and said pawl is mounted eccentrically to said wheel and includes biasing means for urging said pawl into mating position with said ratchet during downward movement of said ratchet.

8. An apparatus according to claim 6, wherein said splicing tape applicator wheel is provided with at least four peripheral faces, each face defining a splicing tape carrying surface, said at least four surfaces collectively defining a polygon and wherein said applicator wheel rotates during each downward movement of the applicator wheel in order to bring a successive peripheral face into contact with two tape ends to be spliced.

9. An apparatus according to claim 8, wherein each corner of said applicator wheel defined by adjoining tape carrying surfaces is provided with a diagonally extending notch therein, and wherein said apparatus further comprises a cutter blade mounted for lateral movement relative to said applicator wheel and through said notch for severing a single length of splicing tape on at least two adjoining surfaces into individual segments covering only one tape carrying surface, and further wherein said body positions said applicator wheel so that the blade passes through the notch and does not impact the wheel itself.

10. A method for feeding and applying splicing tape to two adjacent tape ends, said method comprising:
(a) providing a splicing tape applicator wheel having a plurality of peripheral faces, each face defining a splicing tape carrying surface;
(b) mounting said applicator wheel for rotation;
(c) providing a source of splicing tape or being applied to successive tape carrying surfaces;
(d) moving said applicator wheel into and out of contact with the two tape ends to be spliced on a splice bed for applying a length of splicing tape from said tape carrying surface thereto;
(e) converting the movement of said applicator wheel into unison rotation of said applicator wheel thereby moving a next successive tape carrying surface into position for application of the splicing tape to two adjoining tape ends; and,
(f) aligning said applicator wheel during each movement thereof into exact alignment with said splice bed by means of a stop means engagement member comprising a body having a plurality of shoulders thereon.

11. A method according to claim 10, wherein the step of aligning said applicator wheel comprises the step of positively controlling the rotational movement, if any, during at least a portion of the upward movement thereof out of contact with the splice bed.

12. A method according to claim 11, wherein the step of controlling the movement of said applicator wheel comprises the steps of: providing a rotating member mounted for unison perpendicular and rotational movement with said applicator wheel; engaging said rotational member with a stop during each reciprocation to align the rotating member and the applicator wheel in exact alignment with said splice bed.

* * * * *